UNITED STATES PATENT OFFICE.

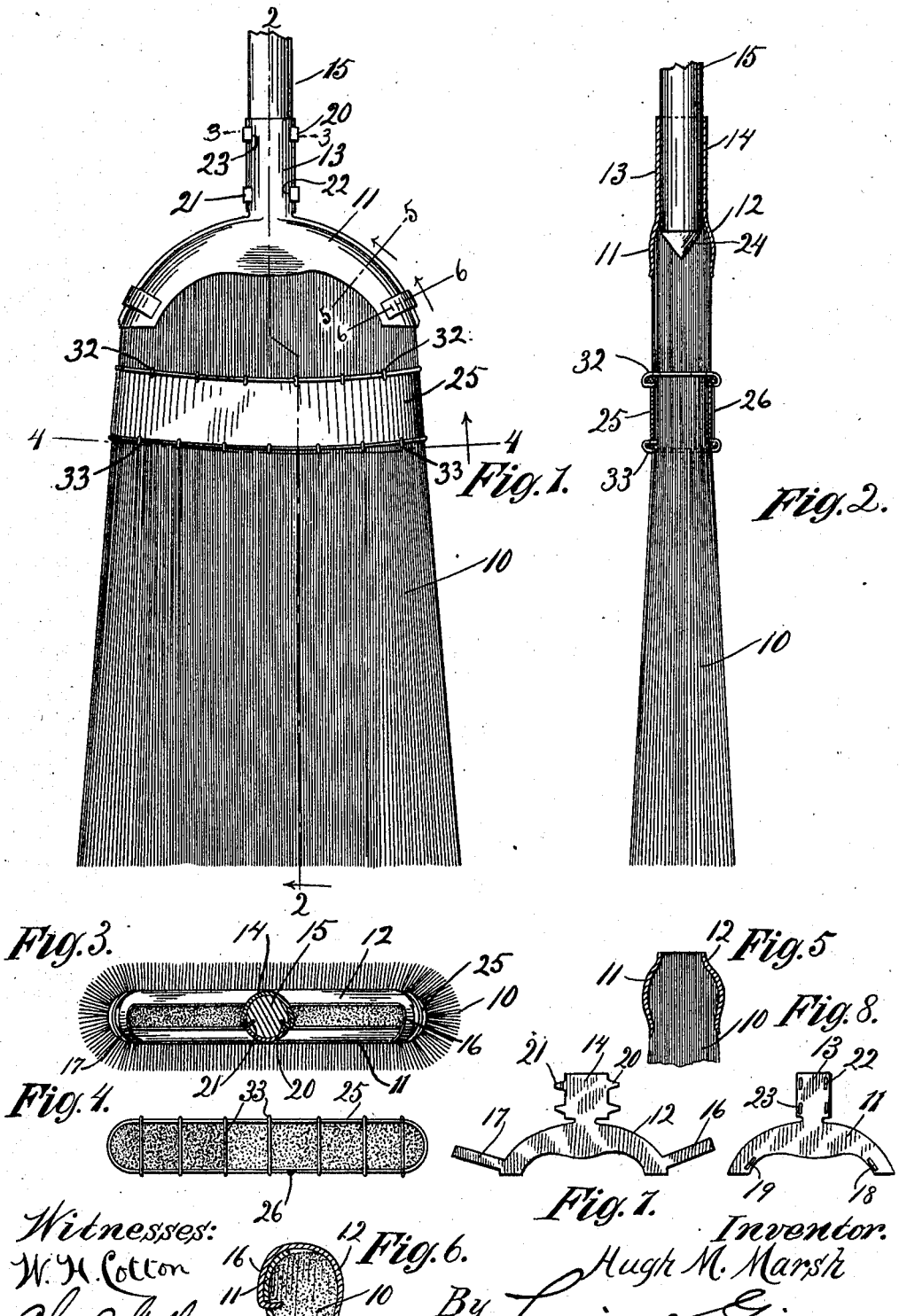

HUGH M. MARSH, OF CHICAGO, ILLINOIS.

BROOM.

970,843.  Specification of Letters Patent.  Patented Sept. 20, 1910.

Application filed April 2, 1908. Serial No. 424,735.

*To all whom it may concern:*

Be it known that I, HUGH M. MARSH, a citizen of the United States, and a resident of Chicago, in the county of Cook and State of Illinois, have invented certain new and useful Improvements in Brooms, of which the following is a specification, and which are illustrated in the accompanying drawings, forming a part thereof.

The invention relates to that class of brooms in which the straw is bound together and secured to the handle by a metal clamp, its object being to simplify the construction of brooms of this class and strengthen the binding or clamping mechanism, the invention consisting of the device hereinafter described and which is illustrated in the accompanying drawings, in which—

Figure 1 is an elevation of the broom showing its flat face, Figs. 2, 3, 4, 5 and 6 are sectional views thereof taken on the lines 2—2, 3—3, 4—4, 5—5 and 6—6 respectively of Fig. 1, and Figs. 7 and 8 are views of the blanks of the mating jaws.

The body 10 of the broom is formed of broom corn, the head thereof being secured between a pair of arc shaped clamping jaws, 11, 12, each having a shank 13, 14, curved to fit upon the handle 15. The jaw 12 has adjacent each of its ends a wing, 16, 17, which are folded over across the head of the broom and inserted through suitable apertures 18, 19, formed in the jaw 11, the end of the wing penetrating the mass of corn. The jaws are bowed outward transversely as shown in Fig. 5 their lower edges being recurved to form a rounded gripping seat to engage the corn. The shank 14 of the jaw 12 is provided with projections or teeth 20, 21, as shown in Fig. 7 adapted to enter corresponding apertures 22, 23 in the shank of the jaw 11 and to be forced into the body of the handle 15. The handle is stayed by having its ends seated within the mass of corn and to facilitate its insertion thereinto is preferably pointed as shown at 24. A metallic band 25 is fitted upon the body of the broom below the clamping jaws, its ends being preferably united by an interlocking seam 26. Preferably the band 25 will be made to grip the corn from opposite sides of the body of the broom by connecting the two sides of the band through the strands of corn. As shown a plurality of wires 32, 33 having hooked ends for engaging the edges of the band are employed for this purpose, several of them being used at intervals along both the upper and lower edges of the band. For interlocking with the hooked ends of the wires 32, 33 the band 25 has preferably a rolled edge as is most clearly shown in Fig. 2. The upper or inner ends of the corn are trimmed flush with the upper edges of the clamping jaws 11, 12.

In making a broom the corn is compressed and the clamping jaws are forced into engagement with it and with each other under sufficient pressure to insure a firm grip and are interlocked as hereinbefore described before the pressure is relieved.

I claim as my invention.

1. In a broom in combination a body composed of corn strands, a pair of clamping jaws binding the heads of the strands together one of such jaws having fingers folded over upon and passing through the other jaw, both jaws having shanks for interfolding the handle, one of such shanks having teeth folded over upon and passing through the other shank and entering the body of the handle.

2. In a broom, in combination, a body composed of corn strands and a handle, and a pair of clamping jaws binding the heads of the strands together, both jaws having shanks for interfolding the handle, one of such shanks having teeth folded over upon and passing through the other shank and entering the body of the handle.

HUGH M. MARSH.

Witnesses:
LOUIS K. GILLSON,
CHARLES B. GILLSON.